United States Patent [19]

Müller et al.

[11] Patent Number: 5,684,108
[45] Date of Patent: Nov. 4, 1997

[54] ETHYLENE-BASED COPOLYMERS AND THEIR USE AS FLOW IMPROVERS IN MINERAL OIL MIDDLE DISTILLATES

[75] Inventors: Hans-Joachim Müller, Grünstadt; Bernd Wenderoth, Birkenau; Albin Berger, Weisenheim; Dieter Littmann, Mannheim; Roger Klimesch, Alsbach-Hähnlein; Knut Oppenländer, Ludwigshafen; Bernd Lothar Marczinke, Speyer; Thomas Rühl, Frankenthal; Marc Heider, Neustadt, all of Germany

[73] Assignee: BASF Aktiengesellschaft, Ludwigshafen, Germany

[21] Appl. No.: 615,175

[22] PCT Filed: Sep. 23, 1994

[86] PCT No.: PCT/EP94/03179

§ 371 Date: Apr. 2, 1996

§ 102(e) Date: Apr. 2, 1996

[87] PCT Pub. No.: WO95/09877

PCT Pub. Date: Apr. 13, 1995

[30] Foreign Application Priority Data

| Oct. 2, 1993 | [DE] | Germany | 43 33 680.9 |
| Dec. 6, 1993 | [DE] | Germany | 43 41 528.8 |
| Dec. 8, 1993 | [DE] | Germany | 43 41 765.5 |

[51] Int. Cl.$^6$ .................... C08F 226/02; C08F 218/04; C10L 1/18; C10L 1/22
[52] U.S. Cl. .................... 526/312; 44/408; 526/330; 526/348.8; 524/555
[58] Field of Search .................... 526/312, 330, 526/348.8; 44/408

[56] References Cited

U.S. PATENT DOCUMENTS 2,787,459  4/1957  Du Bus De Warnaffe .
3,048,479  8/1962  Ilnyckyj et al. .
5,115,036  5/1992  Shiga et al. .................... 525/328.2

FOREIGN PATENT DOCUMENTS 0 340 975  4/1989  European Pat. Off. .
58 80 386  5/1983  Japan .

OTHER PUBLICATIONS

Chemical Abstract 99, 215,519f, 1983 –Abstract of AL.

*Primary Examiner*—Joseph L. Schofer
*Assistant Examiner*—Wu C. Cheng
*Attorney, Agent, or Firm*—Oblon, Spivak, McClelland, Maier & Neustadt, P.C.

[57] ABSTRACT

An ethylene-based copolymer which is suitable as a flow improver for mineral oil middle distillates and is composed of a) from 50 to 94% by weight of ethylene;
b) from 3 to 30% by weight of one or more vinyl esters of $C_2$–$C_6$-monocarboxylic acids;
c) from 3 to 20% by weight of one or more aminoalkyl acrylates of the formula I

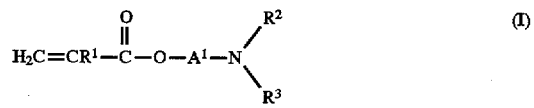

which $R^1$ is hydrogen or methyl, $R^2$ and $R^3$ are identical or different and are each hydrogen or $C_1$–$C_6$-alkyl and $A^1$ is straight-chain or branched $C_2$–$C_{10}$-alkylene; and d) from 0 to 10% by weight of one or more monomers which are copolymerizable with the monomers a) to c), wherein copolymers containing vinyl acetate as monomer b) and having a number average molecular weight of from 5,000 to 50,000 are excluded from the scope of the copolymer.

3 Claims, No Drawings

ETHYLENE-BASED COPOLYMERS AND THEIR USE AS FLOW IMPROVERS IN MINERAL OIL MIDDLE DISTILLATES

BACKGROUND OF THE INVENTION

1. Field of the Invention

The present invention relates to novel ethylene-based copolymers, the use of these and of copolymers known per se as flow improvers in mineral oil middle distillates, and furthermore mineral oil middle distillates which contain these copolymers.

2. Description of the Related Art

Middle distillates, such as gas oils, diesel oils or fuel oils, which are obtained from mineral oils by distillation, have different contents of paraffins, depending on the origin of the crude oil. At relatively low temperatures, solid paraffins separate out (cloud point, CP). On further cooling, the lamellar n-paraffin crystals form a house-of-cards structure, and the middle distillate sets although the predominant part of the middle distillate is still liquid. The flow of the fuels obtained from the mineral oil distillate is considerably impaired by the precipitated n-paraffins in the temperature range between cloud point and pour point. The paraffins block filters and cause nonuniform fuel feed to the combustion units or completely stop the feed. Similar problems occur in the case of fuel oils.

It has long been known that the crystal growth of the paraffins in the combustion and power fuels obtained from the mineral oil middle distillates can be modified by means of suitable additives. Effective additives on the one hand prevent middle distillates from forming such house-of-cards structures and becoming solid at temperatures as low as a few degrees Celsius below the temperature at which the first paraffin crystals crystallize out and, on the other hand, form fine, well-crystallized, separate paraffin crystals which pass through filters in motor vehicles and heating systems or at least form a filter cake which is permeable to the liquid part of the middle distillates, thus ensuring trouble-free operation.

Ethylene/vinyl carboxylate copolymers as disclosed, for example, in U.S. patent application No. 3,048,479 and U.S. patent application No. 3,627,838 have long been used as flow improvers.

A disadvantage of these additives is that, because they have a higher density than the liquid part, the precipitated paraffin crystals tend increasingly to settle out on the bottom of the container during storage. Consequently, a homogeneous phase having a low paraffin content forms in the upper part of the container and a two-phase paraffin-rich layer at the bottom. Since, both in vehicle tanks and in the mineral oil dealers' storage or delivery tanks, the middle distillate is generally withdrawn slightly above the bottom of the container, there is a danger that the high concentration of solid paraffins will lead to blockages of filters and metering means. This danger is all the greater the further the storage temperature is below the precipitation temperature of the paraffins, since the amount of paraffin precipitated is a function of the temperature and increases with decreasing temperature.

JP-A 83/80386 describes flow improvers comprising ethylene, vinyl acetate and N-vinyl-2-pyrrolidone, which however do not give satisfactory results in all cases in practice since the mineral oil fractions to be treated differ greatly in composition, depending on their origin. According to EP-A 405 270, the action of the terpolymers disclosed in the Japanese patent application can be improved by mixing with an ethylene/vinyl acetate co-polymer; on the other hand, the addition of a plurality of polymers to the mineral oil middle distillates is technically very complicated.

U.S. patent application No. 2,787,459 discloses copolymers made from monomers which carry a basic nitrogen atom, such as aminoalkyl acrylates, and those monomers which carry no amino group but a hydrocarbon radical of 8 to 18 carbon atoms. They are used for dispersing sludge, as may be obtained from fuel oils.

EP-A 340 975 describes copolymers of ethylene and aminoalkyl acrylates, which may contain up to 20% by weight of vinyl acetate and have a number average molecular weight of from 5000 to 50,000. The copolymers are used for reducing the concentration of metal ions in aqueous solution.

SUMMARY OF THE INVENTION

It is an object of the present invention to provide copolymers which ensure the flow of mineral oil middle distillates at low temperature and which have a dispersing effect such that settling out of precipitated paraffins is delayed or prevented. The flow improvers should display their action independently of the composition of the mineral oil middle distillates.

We have found that this object is achieved by ethylene-based copolymers which are composed of
a) from 50 to 94% by weight of ethylene,
b) from 3 to 30% by weight of one or more vinyl esters of $C_2$–$C_6$-monocarboxylic acids,
c) from 3 to 20% by weight of one or more aminoalkyl acrylates of the general formula I

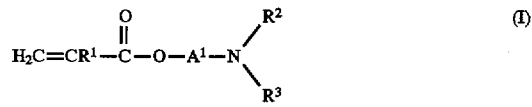

where $R^1$ is hydrogen or methyl, $R^2$ and $R^3$ may be identical or different and are each hydrogen or $C_1$–$C_6$-alkyl and $A^1$ is straight-chain or branched $C_2$–$C_{10}$-alkylene, and
d) from 0 to 10% by weight of one or more monomers which are copolymerizable with the monomer's a) to c),
copolymers in which monomer b) is vinyl acetate and which have a number average molecular weight of from 5000 to 50,000 being excluded, or are composed of
a') from 50 to 95.5% by weight of ethylene,
b') from 4 to 30% by weight of one or more vinyl esters of $C_2$–$C_6$-monocarboxylic acids,
c') from 0.5 to 20% by weight of one or more vinylimidazoles of the general formula II

where $R^4$, $R^5$ and $R^6$ may be identical or different and are each hydrogen or $C_1$–$C_6$-alkyl, or
from 0.5 to 20% by weight of one or more aminoalkyl vinyl ethers of the general formula III

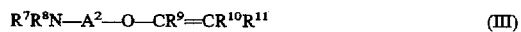

where
$R^7$ and $R^8$ are each $C_1$–$C_6$-alkyl,
$R^9$, $R^{10}$ and $R^{11}$ are each hydrogen or $C_1$–$C_6$-alkyl and $A^2$ is $C_2$–$C_6$-alkylene, and d') from 0 to 10% by weight of one or more monomers which are copolymerizable with the monomers a') to c').

The abovementioned number average is determined by measuring the viscosity (cf. EP-A 340 975).

We have also found the use of the stated copolymers as additives for mineral oil middle distillates, and mineral oil middle distillates which contain these copolymers.

DESCRIPTION OF THE PREFERRED EMBODIMENTS

The novel copolymers have, as a rule, a weight average molecular weight of from 300 to 8000, and, in view of their use as flow improvers those having a molecular weight of from 500 to 5000, especially from 1000 to 3000, are preferred. The molecular weight is determined by gel permeation chromatography. The novel copolymers generally have a viscosity of from 1000 to 2000, preferably from 250 to 1000, mm$^2$/s, determined according to DIN 53 019 at 120° C.

The copolymers are composed of at least three monomers:

a) in the case of aminoalkyl acrylates I as monomers c), the amount of ethylene is preferably from 50 to 92, in particular from 65 to 87, % by weight, or a') in the case of vinylimidazoles II or aminoalkyl vinyl ethers III as monomers c'), the amount of ethylene is preferably from 65 to 94% by weight.

b) Preferred components b) are vinyl acetate and vinyl propionate and mixtures thereof, or compounds such as vinyl butyrate. Preferably, the amount of monomers b) is from 5 to 30, in particular from 10 to 23, % by weight in the case of aminoalkyl acrylates I as monomers c), and from 4 to 23% by weight in the case of vinylimidazoles II or aminoalkyl vinyl ethers III as monomers c').

c) Monomer c) of the general formula I comprises aminoalkyl acrylates and methacrylates. Examples of alkyl radicals $A^1$ are ethylene, n-propylene, n-butylene, dimethylethylene and sec-butylene.

$R^2$ and $R^3$ may be, for example, hydrogen, methyl, ethyl, n-propyl, isobutyl and n-butyl, among which methyl is preferred. Examples of suitable monomers c) are aminoethyl acrylate, amino-n-butyl acrylate, N-methylaminoethyl acrylate, N,N-di-n-butylamino-n-propyl acrylate and the corresponding methacrylates, dimethylaminoethyl acrylate and dimethylaminoethyl methacrylate being preferred.

The monomers are commercially available or can be prepared by known methods, for example by esterifying acrylates with aminoalcohols in the presence of a titanium catalyst (cf. EP-A 188 639).

The preferred amount of aminoalkyl acrylates I as monomers c) is from 3 to 12% by weight.

c') Monomer c') of the general formula II comprises vinylimidazols.

$R^4$, $R^5$ and $R^6$ may be, for example, hydrogen, methyl, ethyl, n-propyl, isopropyl and n-butyl, among which hydrogen is preferred. Examples of suitable monomers c') are 2-methylvinylimidazole, 4-methylvinylimidazole and 5-methylvinylimidazole, the parent structure vinylimidazole being preferred.

The monomers are commercially available or can be prepared by known methods.

The preferred amount of vinylimidazoles II as monomers c') is from 1 to 4% by weight.

Monomer c') of the general formula III comprises aminoalkyl vinyl ethers.

$R^7$, $R^8$, $R^9$, $R^{10}$ and $R^{11}$ may be identical or different and are each $C_1$–$C_6$-alkyl, e.g. methyl, ethyl, n-propyl, isopropyl and n-butyl. $R^9$, $R^{10}$ and $R^{11}$ may furthermore be hydrogen. The $C_2$–$C_6$-alkylene radical $A^2$ is straight-chain or branched alkylene, for example ethylene, n-propylene, dimethylmethylene, methylethylmethylene and dimethylethylene. Preferred compounds are those in which $R^7$ and $R^8$ are identical and are each $C_1$–$C_3$-alkyl, $A^2$ is a straight-chain $C_2$–$C_4$-radical and $R^9$, $R^{10}$ and $R^{11}$ are each hydrogen, as in diethylaminoethyl vinyl ether and dimethylaminopropyl vinyl ether.

These monomers are obtainable, for example, according to Liebigs Ann. Chem. 601 (1956), 81.

The preferred amount of aminoalkyl vinyl ethers III as monomers c') is from 0.5 to 5% by weight.

d) Suitable monomers d) and d') are monomers which are copolymerizable with components a) to c), and a') to c'), respectively, and which may replace these without substantially influencing the properties of the copolymers, e.g. propene. The amount of monomer d) or d') is preferably from 0 to 2% by weight.

The copolymers are prepared in a manner known per se by polymerizing the monomers a) to d) or a') to d'). The vinylimidazole II or the aminoalkyl vinyl ether III is incorporated in preference to ethylene, so that the content of said vinylimidazole or of said aminoalkyl vinyl ether in the novel copolymers is increased compared with the starting monomer mixture. In a preferred embodiment, the monomers are polymerized in the absence of a solvent at from 50 to 400, preferably from 100 to 300, MPa and at from 150° to 350° C., preferably from 180° to 280° C., in the presence of compounds which form free radicals. The average residence time is in general from 60 to 120 seconds. Examples of suitable free radical initiators are peroxides, such as di-tert-butyl peroxide, tert-butyl peroxypivalate or tert-butyl peroxy-3,5,5-trimethylhexanoate, the amount of which is as a rule less than 5% by weight, based on the monomers used in the course of polymerization. In order to prepare low molecular weight copolymers, it is often advantageous to carry out the copolymerization in the presence of regulators, such as $C_1$–$C_4$-aldehydes, e.g. propionaldehyde, or organic SH-containing compounds, the amount of which is in general from 0.1 to 5% by weight, based on the sum of the monomers. The polymerization can be carried out, for example, in an autoclave, a tube reactor or a combination of tube reactor and autoclave.

The novel copolymers are used as additives for mineral oil middle distillates, which are understood as meaning petroleum, fuel oil and diesel fuels having a boiling point of from about 150° to 400° C. The copolymers may be added to the middle distillates directly or, preferably, as a 20–70% strength by weight solution. Suitable solvents are aliphatic or aromatic solvents, such as xylene or mixtures thereof, as well as high-boiling mixtures of aromatics, and middle distillates. The amount of copolymers in the mineral oil middle distillates is as a rule from 10 to 10,000, preferably from 50 to 5000, ppm. Depending on the intended use, the middle distillates may contain further additives, such as flow improvers, dispersants, antifoams, corrosion inhibitors, antioxidants, conductivity improvers and dyes.

Regardless of their origin, the copolymers result in a substantial improvement in the low-temperature flow properties in middle distillates. In addition, they keep precipitated paraffin crystals effectively in suspension, so that there is no blockage of filters and lines by paraffin which has settled out.

EXAMPLES

1. General preparation method I

Ethylene, vinyl propionate or acetate and dimethylaminoethyl acrylate or vinylimidazole are polymerized in an autoclave, with the addition of propionaldehyde as a regulator. The free radical initiation of the polymerization was carried out by continuously metering in an isododecane solution which contained 0.2% by weight of tert-butyl peroxypivalate and 0.5% by weight of tert-butyl peroxy-3, 5,5-trimethylhexanoate. The autoclave had an internal volume of 1 l and a length/diameter ratio of 5:1. The average residence time of the reaction mixture in the autoclave was about 90 seconds.

The polymerization conditions and the ratios of the monomers are listed in Tables 1 and 2 below.

Table 3 shows the composition of the copolymers prepared by the above method with the concomitant use of vinylimidazole.

TABLE 1

| Example No. according to the invention | Reaction pressure [MPa] | Reaction temperature [°C.] | Composition of the reaction mixture[a] | | | | | Free radical initiator[b] | Regulator[c] |
|---|---|---|---|---|---|---|---|---|---|
| | | | $C_2H_4$ | VPr[d] | VAc[e] | DMAEA[f] | DMAEMA[g] | | |
| 1  | 150 | 250 | 85.6 | 10.2 | —    | 4.2 | —   | 13.7 | 2.1  |
| 2  | 150 | 250 | 85.8 | 10.0 | —    | 4.2 | —   | 10.6 | 1.29 |
| 3  | 150 | 235 | 75.0 | 18.2 | —    | 6.8 | —   | 19.1 | 0.80 |
| 4  | 150 | 250 | 79.0 | —    | 15.4 | 5.6 | —   | 9.4  | 1.78 |
| 5  | 150 | 235 | 80.5 | 13.2 | —    | 5.9 | —   | 13.3 | 0.43 |
| 6  | 150 | 235 | 80.1 | 13.6 | —    | 6.3 | —   | 8.3  | 1.23 |
| 7  | 150 | 250 | 75.8 | 19.0 | —    | 5.2 | —   | 22.7 | 1.06 |
| 8  | 150 | 250 | 73.5 | 22.1 | —    | 4.4 | —   | 19.7 | 0.30 |
| 9  | 150 | 230 | 94.0 | —    | 3.0  | —   | 3.2 | 12.2 | 0.42 |
| 10 | 150 | 230 | 88.2 | —    | 4.1  | —   | 7.7 | 14.1 | 0.59 |
| 11 | 150 | 230 | 91.9 | —    | 4.9  | —   | 3.2 | 13.2 | 0.51 |
| 12 | 150 | 230 | 90.5 | —    | 6.5  | —   | 3.0 | 13.9 | 0.72 |
| 13 | 150 | 235 | 75.9 | 16.9 | —    | —   | 7.2 | 18.3 | 0.80 |
| Comparison | | | | | | | | | |
| V 1 | 150 | 250 | 93.7 | — | —    | 6.3  | 2.3 | 8.1  | 2.3 |
| V 2 | 150 | 250 | 94.0 | — | —    | 6.0  | 1.8 | 13.4 | 1.8 |
| V 3 | 190 | 200 | 88.9 | — | 11.1 | —    | 2.1 | 0.96 | 2.1 |

[a] % by weight, based on the reaction mixture
[b] ppm by weight, based on ethylene
[c] % by weight, based on monomers
[d] VPr = vinyl propionate
[e] VAc = vinyl acetate
[f] DMAEA = dimethylaminoethyl acrylate
[g] DMAEMA = dimethylaminoethyl methacrylate

TABLE 2

| Example No. according to the invention | Reaction pressure [MPa] | Reaction temperature [°C.] | Composition of the reaction mixture[a] | | | | Free radical initiator[b] | Regulator[c] |
|---|---|---|---|---|---|---|---|---|
| | | | $C_2H_4$ | VPr[d] | VAc[e] | VI[f] | | |
| 14 | 150 | 236 | 93.2 | 6.1  | —   | 0.8 | 33.1  | 2.8 |
| 15 | 150 | 234 | 93.5 | 5.8  | —   | 0.7 | 6.5   | 2.9 |
| 16 | 151 | 231 | 90.9 | 8.4  | —   | 0.7 | 17.7  | 3.1 |
| 17 | 151 | 235 | 87.9 | 11.4 | —   | 0.7 | 23.8  | 3.1 |
| 18 | 150 | 232 | 85.9 | 13.5 | —   | 0.6 | 27.4  | 2.7 |
| 19 | 151 | 235 | 88.3 | 10.4 | —   | 1.3 | 24.5  | 2.8 |
| 20 | 151 | 234 | 94.1 | —    | 5.2 | 0.7 | 4.7   | 2.9 |
| 21 | 149 | 234 | 66.9 | 29.4 | —   | 3.7 | 193.3 | 0.9 |
| 22 | 151 | 236 | 73.9 | 23.2 | —   | 2.9 | 139.4 | 1.2 |
| 23 | 150 | 234 | 83.8 | 14.4 | —   | 1.8 | 32.9  | 2.9 |
| Comparison V 4 | 190 | 200 | 88.9 | — | 11.1 | — | 1.0 | 2.1 |

[a] % by weight, based on the reaction mixture
[b] ppm by weight, based on ethylene
[c] % by weight, based on monomers
[d] VPr = vinyl propionate
[e] VAc = vinyl acetate
[f] VI = vinylimidazole

TABLE 3

Composition of the copolymers

| Example No. according to the invention | $C_2H_4$ [% by weight] | VPr [% by weight] | VAc [% by weight] | VI [% by weight] | Viscosity*) [mm²/s] |
|---|---|---|---|---|---|
| 14 | 76.5 | 22.1 | — | 1.4 | 460 |
| 15 | 93.9 | 4.7 | — | 1.4 | 420 |
| 16 | 91.7 | 6.9 | — | 1.4 | 250 |
| 17 | 89.9 | 8.8 | — | 1.3 | 250 |
| 18 | 86.9 | 12.0 | — | 1.1 | 240 |
| 19 | 88.9 | 8.6 | — | 2.5 | 230 |
| 20 | 92.9 | — | 5.7 | 1.4 | 240 |
| 21 | 68.1 | 24.9 | — | 7.0 | 460 |
| 22 | 75.3 | 1.3 | — | 5.4 | 480 |
| 23 | 85.9 | 10.6 | — | 3.5 | 250 |
| Comparison V 4 | 88.9 | — | 11.1 | — | 280 |

*)in the rotary viscometer according to DIN 53 019 at 120° C; vinylimidazole is more readily incorporated into the copolymer than is ethylene 2. General preparation method II Ethylene, vinyl propionate or acetate and diethylaminoethyl vinyl ether were polymerized in an autoclave, with the addition of propionaldehyde as regulator. The free radical initiation of the polymerization was carried out at 235° C. and 150 MPa by continuously metering in an isododecane solution which contains 0.2% by weight of tert-butyl peroxypivalate and 0.5% by weight of tert-butyl peroxy-3,5,5-trimethylhexanoate. The autoclave had an internal volume of 1 l and a length/diameter ratio of 5:1. The average residence time of the reaction mixture in the autoclave was about 90 seconds.

The polymerization conditions and the ratios of the monomers in the reaction mixture are listed in Table 4 below. Table 5 shows the composition of the copolymers prepared by the above method.

TABLE 4

| Example No. according to the invention | Composition of the reaction mixture<sup>a)</sup> | | | Free radical initiator<sup>b)</sup> | Regulator<sup>c)</sup> |
|---|---|---|---|---|---|
| | $C_2H_4$ | VPr<sup>d)</sup> | DEAEVE<sup>e)</sup> | | |
| 24 | 93.7 | 5.7 | 0.6 | 1.8 | 2.7 |
| 25 | 83.4 | 15.0 | 1.6 | 9.9 | 1.9 |
| 26 | 74.6 | 23.0 | 2.4 | 32.6 | 0.4 |
| 27 | 86.6 | 7.8 | 3.6 | 6.9 | 2.0 |
| 28 | 82.5 | 10.9 | 5.0 | 10.6 | 1.7 |
| 29 | 78.7 | 13.9 | 6.3 | 18.6 | 1.1 |
| 30 | 75.4 | 16.3 | 7.4 | 18.9 | 0.9 |
| 31 | 72.2 | 18.8 | 8.6 | 42.5 | 0.4 |
| Comparison V 5 | 78.8 | 21.2 | — | 2.0 | 1.9 |

<sup>a)</sup>% by weight, based on reaction mixture
<sup>b)</sup>ppm by weight, based on ethylene
<sup>c)</sup>% by weight, based on monomers
<sup>d)</sup>VPr = vinyl propionate
<sup>e)</sup>DEAEVE = diethylaminoethyl vinyl ether

TABLE 5

Composition of the copolymers

| Example No. according to the invention | $C_2H_4$ [% by weight] | VPr [% by weight] | DEAEVE [% by weight] | Viscostiy*) [mm²/s] |
|---|---|---|---|---|
| 24 | 94.4 | 5.1 | 0.5 | 450 |
| 25 | 87.0 | 12.0 | 1.0 | 480 |
| 26 | 84.9 | 13.6 | 1.5 | 400 |
| 27 | 93.1 | 5.1 | 1.8 | 460 |
| 28 | 89.3 | 8.1 | 2.6 | 410 |
| 29 | 86.5 | 10.0 | 3.4 | 420 |
| 30 | 82.6 | 13.3 | 4.1 | 410 |
| 31 | 79.3 | 16.0 | 4.7 | 390 |
| Comparison V 5 | 86.8 | 13.2 | — | 460 |

*)in the rotary viscometer according to DIN 53 019 at 120° C.; DEAEVE is more readily incorporated into the copolymer than is ethylene.

3. Use examples

The novel copolymers and the comparative compounds were tested in a number of middle distillates. These are diesel fuels of commercial German refinery quality; they are referred to as DK 1 to DK 7:

| | DK 1 | DK 2 | DK 3 | DK 4 | DK 5 | DK 6 | DK 7 |
|---|---|---|---|---|---|---|---|
| Cloud point (°C.) | −8 | −7 | −4 | −7 | −8 | −7 | −7 |
| CFPP (°C.) | −12 | −10 | −7 | −14 | −10 | −9 | −9 |
| Density at 20° C. (g/ml) | 0.831 | 0.829 | 0.832 | 0.814 | 0.831 | 0.831 | 0.826 |
| Initial boiling point (°C.) | 175 | 183 | 171 | 164 | 175 | 172 | 172 |
| 20% boiling point (°C.) | 223 | 211 | 220 | 206 | 223 | 216 | 217 |
| 90% boiling point (°C.) | 314 | 317 | 332 | 306 | 314 | 325 | 321 |
| Final boiling point (°C.) | 352 | 364 | 363 | 337 | 352 | 343 | 356 |

3.1 Description of the test methods

The appropriate amounts of the novel examples 1 to 31 and Comparative Examples V1 to V5 (50% strength in Solvesso® 150, a high-boiling aromatic hydrocarbon mixture from Esso) were added to the middle distillates at 40° C. with stirring, and the mixture was then cooled to room temperature.

Test 1

The middle distillates containing the additive were stored in 100 ml measuring cylinders for 20 hours in a refrigerator at −13° C. The volume and appearance of the paraffin phase which had settled out and the oil phase above this were then determined and evaluated visually. In addition, the cold filter plugging point (CFPP) of each sample was measured according to DIN EN 116.

The results are shown in Tables 6 to 14. It is evident that the novel copolymers 1 to 31 have not only a good CFPP-improving effect but also an excellent effect as paraffin dispersants. In contrast, the comonomeric Comparative Examples V1 and V2 based on ethylene/amino acrylate lead only to an insufficient improvement in the CFPP, and Example V3 based on ethylene/vinyl propionate is ineffective as paraffin dispersant. Comparative Example V4 based on ethylene/vinyl acetate leads only to an insufficient paraffin-dispersing effect. Comparative Example V5, too, does not lead to sufficient dispersing of the paraffins.

TABLE 6

Dispersing tests (Test 1) in DK 1, CP: −8° C., CFPP: −12° C.

| | | | Paraffin phase | | Oil phase | |
|---|---|---|---|---|---|---|
| Ex. | Dose (ppm) | CFPP (°C.) | (% by vol.) | Appearance | (% by vol.) | Appearance |
| 1 | 300 | −24 | 95 | dispersed | 5 | clear |
| 2 | 300 | −23 | 95 | dispersed | 5 | clear |
| 3 | 300 | −22 | 100 | dispersed | 0 | — |
| 4 | 300 | −24 | 90 | dispersed | 10 | clear |
| 5 | 300 | −26 | 85 | dispersed | 15 | clear |
| 6 | 300 | −25 | 100 | dispersed | 0 | — |
| 7 | 300 | −29 | 90 | dispersed | 10 | clear |
| 8 | 300 | −25 | 85 | dispersed | 15 | clear |
| Comp. V1 | 300 | −17 | 100 | dispersed | 0 | — |
| V2 | 300 | −18 | 100 | dispersed | 0 | — |
| V3 | 300 | −25 | 55 | flocculent | 45 | clear |

TABLE 7

Dispersing tests (Test 1) in DK 2, CP: −7° C., CFPP: −10° C.

| | | | Paraffin phase | | Oil phase | |
|---|---|---|---|---|---|---|
| Ex. | Dose (ppm) | CFPP (°C.) | (% by vol.) | Appearance | (% by vol.) | Appearance |
| 2 | 300 | −23 | 80 | dispersed | 20 | clear |
| 5 | 300 | −26 | 100 | dispersed | 0 | — |
| 6 | 300 | −25 | 100 | dispersed | 0 | — |
| 8 | 300 | −25 | 80 | dispersed | 20 | clear |

TABLE 8

Dispersing tests (Test 1) in DK 3, CP: −4° C., CFPP: −7° C.

| | | | Paraffin phase | | Oil phase | |
|---|---|---|---|---|---|---|
| Ex. | Dose (ppm) | CFPP (°C.) | (% by vol.) | Appearance | (% by vol.) | Appearance |
| 1 | 300 | −18 | 95 | dispersed | 5 | clear |
| 2 | 300 | −17 | 100 | dispersed | 0 | — |
| 4 | 300 | −19 | 95 | dispersed | 5 | clear |
| 5 | 300 | −19 | 100 | dispersed | 0 | — |
| 6 | 300 | −18 | 95 | dispersed | 5 | clear |
| 9 | 300 | −17 | 100 | dispersed | 0 | — |
| 10 | 300 | −18 | 95 | dispersed | 5 | clear |
| 11 | 300 | −18 | 100 | dispersed | 0 | — |
| 12 | 300 | −19 | 100 | dispersed | 0 | — |
| 13 | 300 | −17 | 100 | dispersed | 0 | — |
| Comp. V3 | 300 | −19 | 30 | flocculent | 70 | clear |

TABLE 9

Dispersing tests in DK 5, CP: −8° C., CFPP: −10° C.

| | | | Paraffin phase | | Oil phase | |
|---|---|---|---|---|---|---|
| Ex. | Dose (ppm) | CFPP (°C.) | (% by vol.) | Appearance | (% by vol.) | Appearance |
| 14 | 300 | −24 | 90 | dispersed | 10 | clear |
| 15 | 300 | −19 | 85 | dispersed | 15 | clear |
| 16 | 300 | −24 | 80 | dispersed | 20 | cloudy |
| 17 | 300 | −22 | 95 | dispersed | 5 | clear |
| 18 | 300 | −25 | 70 | dispersed | 30 | clear |
| 19 | 300 | −20 | 80 | dispersed | 20 | cloudy |
| 20 | 300 | −24 | 100 | dispersed | 0 | — |
| Comp. V4 | 300 | −25 | 55 | flocculent | 45 | clear |

TABLE 10

Dispersing tests in DK 6, CP: −7° C., CFPP: −9° C.

| | | | Paraffin phase | | Oil phase | |
|---|---|---|---|---|---|---|
| Ex. | Dose (ppm) | CFPP (°C.) | (% by vol.) | Appearance | (% by vol.) | Appearance |
| 15 | 300 | −14 | 100 | dispersed | 0 | — |
| 16 | 300 | −13 | 100 | dispersed | 0 | — |
| 17 | 300 | −14 | 100 | dispersed | 0 | — |
| 18 | 300 | −14 | 100 | dispersed | 0 | — |
| 19 | 300 | −14 | 100 | dispersed | 0 | — |
| 20 | 300 | −13 | 100 | dispersed | 0 | — |
| Comp. V4 | 300 | −19 | 30 | flocculent | 70 | clear |

TABLE 11

Dispersing tests in DK 7, CP: −7° C., CFPP: −9° C.

| | | | Paraffin phase | | Oil phase | |
|---|---|---|---|---|---|---|
| Ex. | Dose (ppm) | CFPP (°C.) | (% by vol.) | Appearance | (% by vol.) | Appearance |
| 14 | 300 | −14 | 100 | dispersed | 0 | — |
| 15 | 300 | −12 | 100 | dispersed | 0 | — |
| 16 | 300 | −13 | 100 | dispersed | 0 | — |
| 17 | 300 | −13 | 100 | dispersed | 0 | — |
| 18 | 300 | −13 | 90 | dispersed | 10 | clear |
| 19 | 300 | −12 | 100 | dispersed | 0 | — |
| 20 | 300 | −13 | 100 | dispersed | 0 | — |

TABLE 12

Dispersing tests in DK 5, CP: −8° C., CFPP: −10° C.

| | | | Paraffin phase | | Oil phase | |
|---|---|---|---|---|---|---|
| Ex. | Dose (ppm) | CFPP (°C.) | (% by vol.) | Appearance | (% by vol.) | Appearance |
| 24 | 300 | −18 | 90 | dispersed | 10 | clear |
| 27 | 300 | −20 | 97 | dispersed | 3 | clear |
| 28 | 300 | −20 | 85 | dispersed | 15 | clear |
| 29 | 300 | −24 | 90 | dispersed | 10 | clear |
| 30 | 300 | −25 | 90 | dispersed | 10 | clear |
| 31 | 300 | −26 | 99 | dispersed | 5 | clear |
| Comp. V5 | 300 | −25 | 55 | flocculent | 45 | clear |

TABLE 13

Dispersing tests in DK 2, CP: −7° C., CFPP: −10° C.

| Ex. | Dose (ppm) | CFPP (°C.) | Paraffin phase (% by vol.) | Appearance | Oil phase (% by vol.) | Appearance |
|---|---|---|---|---|---|---|
| 25 | 300 | −20 | 70 | dispersed | 30 | clear |
| 26 | 300 | −27 | 70 | dispersed | 30 | clear |

TABLE 14

Dispersing tests in DK 7, CP: −7° C., CFPP: −9° C.

| Ex. | Dose (ppm) | CFPP (°C.) | Paraffin phase (% by vol.) | Appearance | Oil phase (% by vol.) | Appearance |
|---|---|---|---|---|---|---|
| 24 | 300 | −12 | 100 | dispersed | 0 | — |
| 25 | 300 | −12 | 75 | dispersed | 25 | clear |

Test 2

The additive-containing middle distillates were cooled in 500 ml glass cylinders in a cold bath from room temperature to −18° C. and stored for 20 hours at this temperature. The amount and appearance of the paraffin phase were then determined and evaluated visually. The cold filter plugging point (CFPP) of each sample of the 20% by volume of bottom phase separated off at −18° C. was determined according to DIN EN 116 and the cloud point (CP) according to ASTM D 2500.

TABLE 15

Dispersing tests (Test 2) in DK 4, CP: −7° C., CFPP: −14° C.

| Ex. | Dose (ppm) | CFPP (°C.) | Paraffin phase (% by vol.) | Appearance | 20% bottom phase CFPP (°C.) | CP (°C.) |
|---|---|---|---|---|---|---|
| 1 | 300 | −26 | 100 | dispersed | −25 | −11 |
| 2 | 300 | −25 | 100 | dispersed | −24 | −10 |
| 5 | 300 | −25 | 100 | dispersed | −25 | −13 |

The measured values in Table 5 show that the novel copolymers have not only a good CFPP-improving effect but also an excellent effect as paraffin dispersants, which is evident from the good agreement of the CFPP values (20% bottom phase) with the total CFPP values.

We claim:

1. A process for improving the flow properties of a mineral oil middle distillate, which comprises adding an ethylene based copolymer which is comprised of:

a) from 50 to 94% by weight of ethylene;

b) from 3 to 30% by weight of one or more vinyl esters of $C_2$-$C_6$-monocarboxylic acids;

c) from 3 to 20% by weight of one or more aminoalkyl acrylates of the formula I

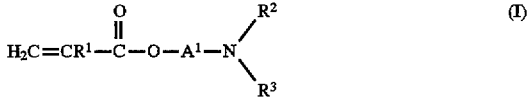

which $R^1$ is hydrogen or methyl, $R^2$ and $R^3$ are identical or different and are each hydrogen or $C_1$-$C_6$-alkyl and $A^1$ is straight-chain or branched $C_2$-$C_{10}$-alkylene; and d) from 0 to 10% by weight of one or more monomers which are copolymerizable with the monomers a) to c), to the mineral oil middle distillate, wherein copolymers containing vinyl acetate as monomer b) and having a number average molecular weight of from 5,000 to 50,000 are excluded from the scope of the copolymer.

2. A process as claimed in claim 1, wherein a copolymer having a weight average molecular weight of from 500 to 5000 is added to a mineral oil middle distillate.

3. A mineral oil middle distillate containing a flow-improving effective amount of an ethylene based copolymer which is comprised of:

a) from 50 to 94% by weight of ethylene;

b) from 3 to 30% by weight of one or more vinyl esters of $C_2$-$C_6$-monocarboxylic acids;

c) from 3 to 20% by weight of one or more aminoalkyl acrylates of the formula I

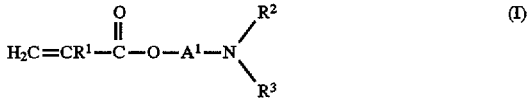

which $R^1$ is hydrogen or methyl, $R^2$ and $R^3$ are identical or different and are each hydrogen or $C_1$-$C_6$-alkyl and $A^1$ is straight-chain or branched $C_2$-$C_{10}$-alkylene; and d) from 0 to 10% by weight of one or more monomers which are copolymerizable with the monomers a) to c), wherein copolymers containing vinyl acetate as monomer b) and having a number average molecular weight of from 5,000 to 50,000 are excluded from the scope of the copolymer.

* * * * *